US006892573B2

(12) United States Patent
Gansebom

(10) Patent No.: US 6,892,573 B2
(45) Date of Patent: May 17, 2005

(54) SIDE-MOUNTABLE FLUID LEVEL SENSOR

(75) Inventor: Neil Gansebom, Madison, WI (US)

(73) Assignee: Key Safety Systems, Inc., Sterling Heights, MI (US)

(*) Notice: Subject to any disclaimer, the term of this patent is extended or adjusted under 35 U.S.C. 154(b) by 104 days.

(21) Appl. No.: 10/410,477

(22) Filed: Apr. 10, 2003

(65) Prior Publication Data
US 2004/0200278 A1 Oct. 14, 2004

(51) Int. Cl.[7] .................. G01F 23/56; G01F 23/76; H01H 35/18
(52) U.S. Cl. .................. 73/305; 73/322.5; 200/84 C
(58) Field of Search .................. 73/322.5, 290 R, 73/305; 200/84 B, 84 C, 84 R

(56) References Cited

U.S. PATENT DOCUMENTS

| 2,851,566 | A | | 9/1958 | Fuller .................. 200/84 |
|---|---|---|---|---|
| 3,750,124 | A | | 7/1973 | Barnes et al. |
| 3,751,616 | A | | 8/1973 | Innes et al. .................. 200/84 |
| 3,997,744 | A | | 12/1976 | Higo |
| 4,139,750 | A | | 2/1979 | Rau .................. 200/84 R |
| 4,258,238 | A | | 3/1981 | Dombrowski et al. .................. 200/84 |
| 4,513,185 | A | | 4/1985 | Walters .................. 200/84 |
| 4,609,796 | A | | 9/1986 | Bergsma .................. 200/84 R |
| 4,804,944 | A | * | 2/1989 | Golladay et al. .................. 340/624 |
| 4,883,928 | A | | 11/1989 | Umehara .................. 200/81.9 M |
| 5,083,115 | A | | 1/1992 | Kamiya |
| 5,224,379 | A | * | 7/1993 | Koebernik et al. .................. 73/308 |
| 5,254,815 | A | * | 10/1993 | Nakano et al. .................. 200/84 C |
| 5,458,508 | A | | 10/1995 | Sawada .................. 439/620 |
| 5,581,062 | A | * | 12/1996 | Gomez, Jr. .................. 200/84 C |
| 5,742,999 | A | * | 4/1998 | Gomez, Jr. .................. 29/622 |
| 5,827,962 | A | | 10/1998 | Guenther et al. .................. 73/308 |
| 6,253,608 | B1 | * | 7/2001 | Faulhaber .................. 73/305 |
| 6,380,499 | B1 | | 4/2002 | Edwards .................. 200/84 |
| 6,408,692 | B1 | * | 6/2002 | Glahn .................. 73/313 |

FOREIGN PATENT DOCUMENTS

GB 865 505 A 4/1961

* cited by examiner

Primary Examiner—Helen Kwok
(74) Attorney, Agent, or Firm—Lonnie Drayer; Patrick Stiennon

(57) ABSTRACT

A side-mounted float sensor has eight components: a reed switch, two leads, a molded connector, a sensor body, a sealing grommet, a float, and an activation magnet. The two leads are assembled to the molded connector and the reed switch is welded across the leads. The molded connector is inserted into the sensor body. The sensor body has an opening that receives a portion of the float. The float is keyed to the sensor body and a flange extends from the sensor body so that the float can only be installed on one side of the sensor body. The float rests on an upper portion of the sensor body and is completely contained behind a circular disk which terminates the sensor body and guides the sensor body during insertion through the sealing grommet.

14 Claims, 2 Drawing Sheets

SIDE-MOUNTABLE FLUID LEVEL SENSOR

FIELD OF THE INVENTION

The present invention relates to float sensors for monitoring the level of the liquid in a container in general, and more particularly to float sensors which can be mounted in the side of a fluid container.

BACKGROUND OF THE INVENTION

There are many applications where fluid is stored in a tank and drawn from the tank for use either periodically or continuously. In some cases it is desirable to continuously monitor the level of the fluid within the tank, for example in the case of a gas tank, so that the range of the vehicle can be determined at any time. In other situations, most notably in the case of a windshield washer tank, fluid is drawn out infrequently and a simple indication of when the fluid level is low is all that is needed. When a low fluid level is indicated, sufficient fluid remains so as to allow a refilling of the fluid tank without undue inconvenience. In many instances replacement of non-critical fluids is dependent on the owner or service technician periodically checking the level of the fluid. However, with the demise of the full-service gas station and because of the increased reliability and longer times between periodic maintenance such as oil changes, vehicles may go six months to a year without maintenance. The vehicle operators, because of the greater reliability of vehicles, can be less informed about the mechanical systems of their vehicles and thus less likely to make routine maintenance checks. Nevertheless, the availability of windshield wiper fluid can be more than a convenience if it is necessary to enhance or maintain visibility. A low wiper fluid indicator is desirable even on low cost economy vehicles.

Cost and reliability are influenced by simplicity in construction and assembly. What is needed is a fluid level sensor that meets the criteria of simplicity of construction and assembly.

SUMMARY OF THE INVENTION

The side-mounted float sensor of this invention has eight components: a reed switch, two leads, a molded connector, a sensor body, a sealing grommet, a float, and an activation magnet. The two leads are assembled to the molded connector and the reed switch is welded across the leads to complete the electrical circuit between the leads when the reed switch is closed. The molded connector is inserted into the sensor body and attached by heat staking. The molded plastic connector has a clocking flange which orients the float sensor by fitting within a corresponding depression in the exterior of a tank. The sensor body has an opening which receives a piston portion of the float. The float is keyed to the sensor body so that it can be inserted in only one orientation, and a flange extends from the sensor body so that the float can only be installed on one side of the sensor body. The float is constructed of low density molded plastic and has a cavity into which a ceramic magnet is heat staked. The sensor body terminates in a circular disk which guides the sensor body during insertion into a side wall of the fluid tank through the sealing grommet. The float, when resting on an upper portion of the sensor body is completely contained behind the circular disk. Thus the float does not produce interference with the sealing grommet when the sensor body is inserted through the sealing grommet into the fluid tank. When the tank is filled with fluid the sensor floats upwardly away from the sensor body so the activation magnet is sufficiently distant from the reed switch that the switch opens. When the fluid level in the tank falls below the float, the float sinks and the magnet causes the reed switch to close.

It is a feature of the present invention to provide a float sensor which facilitates correct assembly.

It is another feature of the present invention to provide a side-mounted float sensor of low cost in construction and assembly.

It is a further feature of the present invention to provide a side-mounted float sensor having few parts.

Further features and advantages of the invention will be apparent from the following detailed description when taken in conjunction with the accompanying drawings.

DETAILED DESCRIPTION OF THE INVENTION

Figure 1:
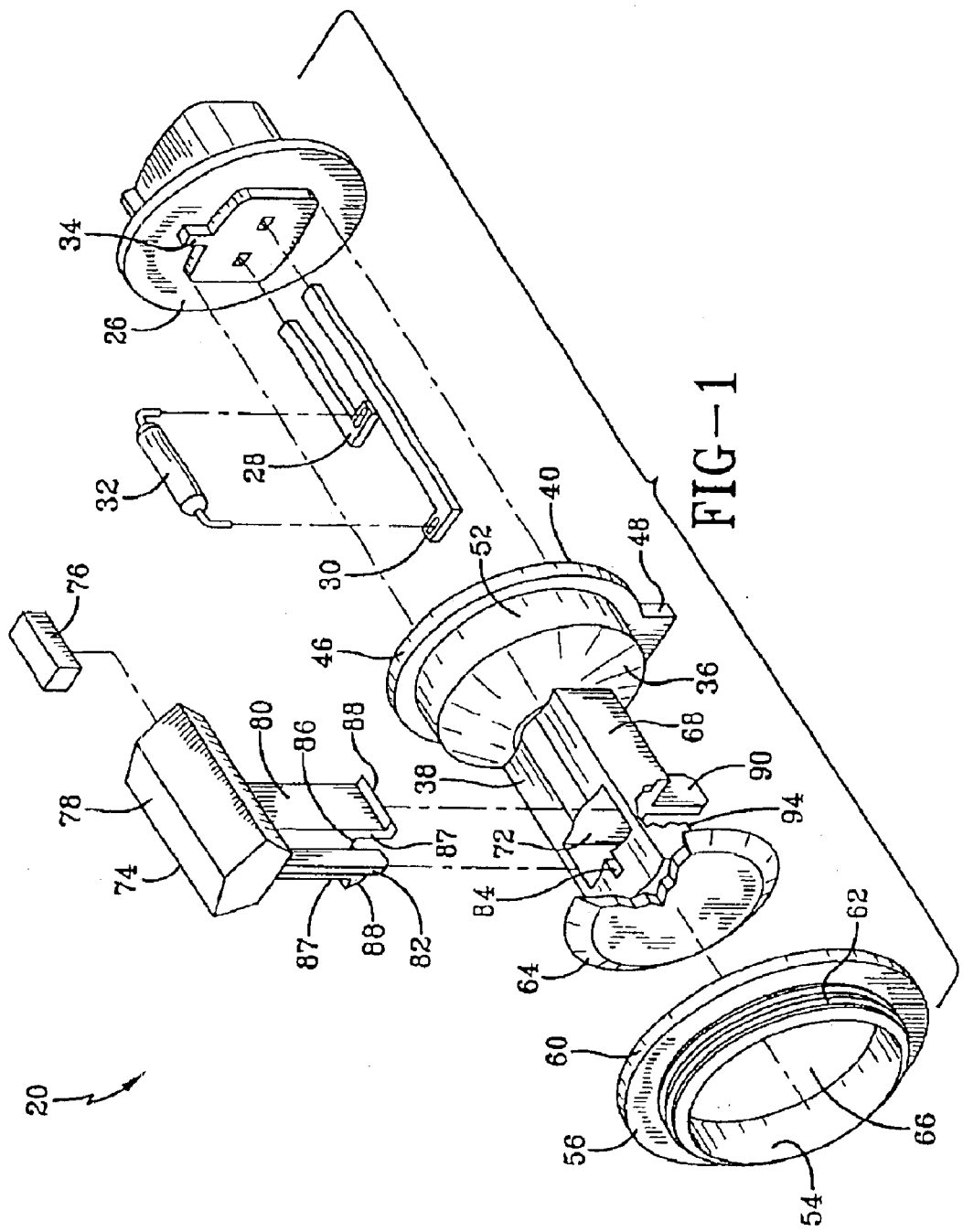
FIG. 1 is an exploded isometric view of the side-mounted float sensor of this invention.
Figure 2:
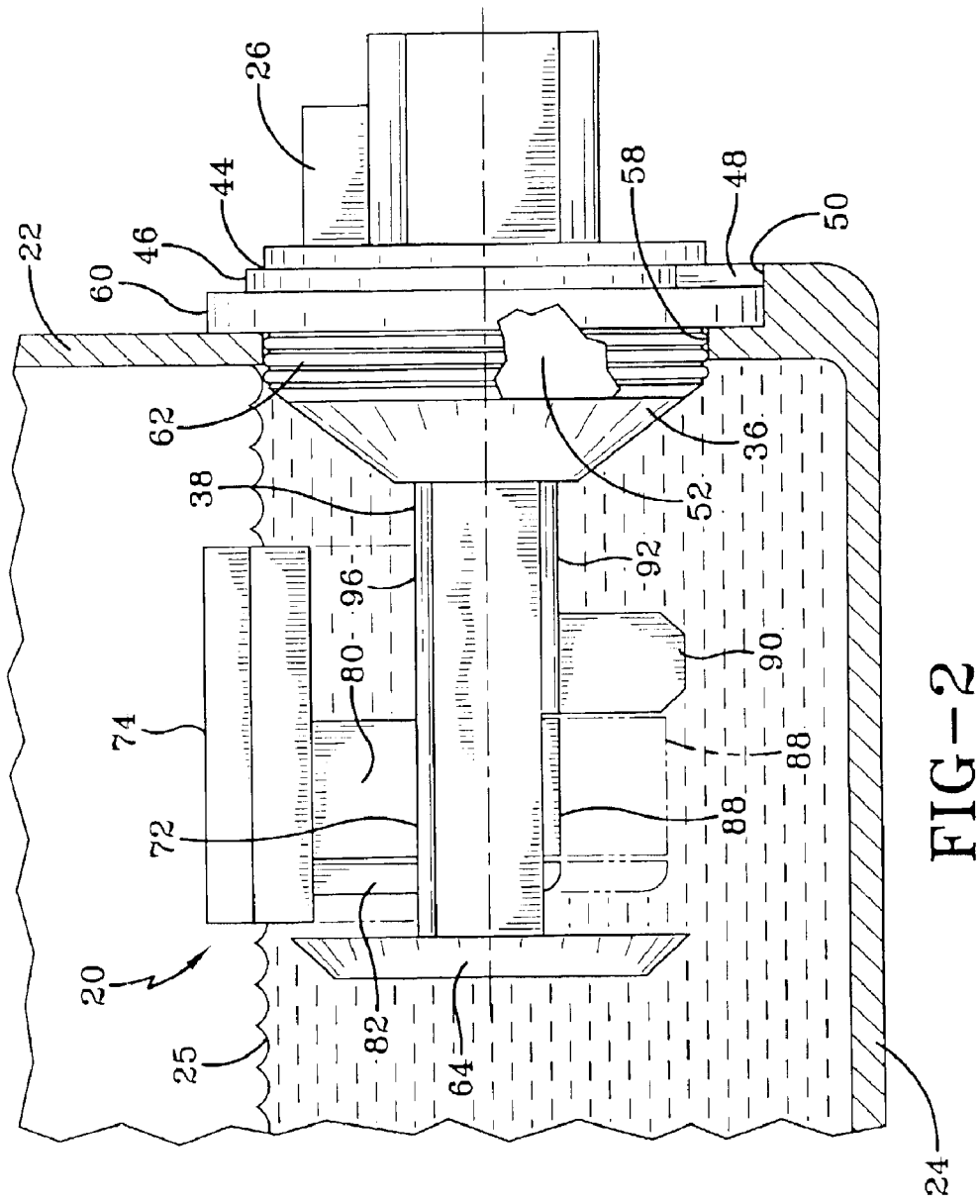
FIG. 2 is a side elevational view of the float sensor of FIG. 1 mounted to the tank shown in cross section.

Referring more particularly to FIGS. 1–2, wherein like numbers refer to similar parts, a float sensor 20 is shown in FIG. 2. The float sensor 20 is mounted through the side wall 22 of a tank 24, containing a liquid 25 such as washer fluid. As shown in FIG. 1, the float sensor 20 has an injection molded connector 26 to which is mounted a short lead frame 28, a long lead frame 30, and a reed switch 32. The lead frames 28, 30 are inserted into the molded connector 26 and the reed switch 32 is welded to the leads so that when the switch is closed current flows between the leads 28, 30. Typically a flow of current through the reed switch 32 is used to indicate a low fluid condition.

The connector 26 is inserted into a sensor body 38 through an opening (not shown) formed in the base 36 of the sensor body 38. The connector 26 has a clocking feature 34 which fits within a matched feature (not shown) in the base 36 of the sensor body 38, to assure correct orientation of the connector 26 and the attached reed switch with respect to the sensor body 38. The connector 26 may be bonded, but is preferably heat staked, to the sensor body. Because the juncture 44 between the connector 26 and the sensor body 38 is outside the tank 24, and the reed switch 32 is hermetically sealed by its design, the connection between the connector 26 and the sensor body 38 does not require a hermetic seal.

The sensor body 38 has a flange 46 which extends from the base 36. The flange 46 has a clocking feature 48 which inter-fits with a feature 50 on the exterior of the tank wall 22 to orient the sensor body 38 with respect to the tank 24. The base 36 has a cylindrical sealing surface 52 which engages the inside surface 54 of an elastomeric grommet 56 which fits within an opening 58 formed in the side wall 22 of the tank 24. The flange 46 engages against a flange 60 on the elastomeric grommet 56. Both the flange 46 on the sensor body 38 and the flange 60 on the elastomeric grommet 56 serve the function of holding a portion of the sensor body 38 or the grommet 56 on the outside of the tank wall 22. The elastomeric grommet 56 has a ridged exterior circumferential surface 62 which serves to lock the grommet 56 within the opening 58 in the side wall of the tank 24. The sensor body 38 terminates in a circular disk 64 which guides the insertion of the sensor body 38 through the central opening 66 of the grommet 56.

A generally prismatic horizontal shaft 68 extends horizontally from the base 36 of the sensor body 38. The shaft 68 has a base portion 70 adjacent the base 36 of the sensor body which contains the reed switch 32. Further along the shaft 68 away from the base, are portions forming a substantially rectangular vertical opening 72. A float 74 has a body portion 78 positioned above the horizontal shaft 68 and a rectangular member 80 which extends downwardly into the vertical opening 72 in the horizontal shaft 68. The float 74 has an opening (not shown) in the body portion into which an activation magnet 76 is inserted above the float member 80. The magnet 76 is bonded or heat staked in place. The float 74 is constructed from polypropylene to which a blowing agent has been added, in order to have a density, in combination with the magnet, considerably less than window washer fluid. The rectangular vertical member 80 has a rectangular rail 82 extending from one face of the member 80. The rail 82 fits within a groove 84 co-formed with the vertical opening 72 to positively orient the rectangular member 80 and thus the body portion 78 of the float which contains the activation magnet 76. The float vertical member 80 and the vertical opening 72 in the sensor body 38 are complementary in shape and not axisymmetric so that the vertical member can be positioned in the only one orientation within the opening.

The lower part of the rectangular member 80 has a relieved portion 86 which forms two resilient flanges 87 which have barbs 88 formed on lowermost outwardly facing ends. To assemble the float 74 to the sensor body 38 the resilient flanges 87 or biasing members are bent inwardly so that the barbs 88 can pass through the rectangular vertical opening 72. Once the barbs 88 pass through the vertical opening 72, they are biased to resiliently spring outwardly, capturing the float 74 to the sensor body 38. Once inserted, the barbs 88 thus prevent removal of the float 74 from the sensor body 38. To prevent incorrect assembly of the float 74 with the sensor body 38, a projection 90 extends from the lower side 92 of the base portion 70 of the horizontal shaft 68. The projection 90 prevents the vertical member 80 from being inserted far enough for the barbs to hold the float on the under side 94 of the vertical opening 72. The upper surface 96 of the base portion 70 of the horizontal shaft 68 is convex having a narrow central strip which sloped side walls. The convex upper surface thus presents a small region of contact with the body portion 78 of the float when it is in a lowered position. This reduced contact area between the possibly damp float and the horizontal shaft 68 helps to prevent surface tension from overcoming the buoyancy forces on the float 74, which would prevent the float rising in response to the addition of liquid 25 to the container 24.

It is understood that the invention is not limited to the particular construction and arrangement of parts herein illustrated and described, but embraces all such modified forms thereof as come within the scope of the following claims.

I claim:

1. A float sensor for insertion in a side wall of a tank of the type having:
    a connector having two leads and having a portion which remains outside of the tank;
    an elastomeric grommet positionable within a hole formed in the vertical wall;
    a horizontal shaft extending from the connector and terminating in an insertion guide structure, for insertion through the grommet into the tank;
    a reed switch positioned within the horizontal shaft and connected across the two leads;
    a float body containing an activation magnet mounted to the horizontal shaft for vertical movement in response to the presence of liquid in the tank;
    wherein the improvement comprises:
    a vertical member extending downwardly from the float body, and having at least one resiliently biasing member;
    portions of the horizontal shaft which form an opening through which the vertical member extends, the resilient biasing member preventing the vertical member from being removed through the opening.

2. The float sensor of claim 1 wherein the horizontal shaft has an upper surface and a lower surface, and further comprising a flange which extends from the lower surface and which prevents mounting the float body over the lower surface.

3. The float sensor of claim 2 wherein the upper surface of the horizontal shaft is convex.

4. The float sensor of claim 1 wherein the vertical member and the opening are complementary in shape and not axisymmetric so that the vertical member can be positioned in the only one orientation within the opening.

5. A float sensor for insertion in a vertical wall of a tank comprising:
    a float sensor body having a base and a flange extending from the base;
    an elastomeric grommet surrounding the base and abutting the flange for sealing the base to an opening in a tank wall with the flange mounted external to the tank;
    a horizontal shaft extending from the base, the horizontal shaft having a portion adjacent the base and a portion distal from the base, wherein the portion adjacent the base contains a magnetically activated switch, and the portion distal from the base forms a vertical hole which passes through the horizontal shaft;
    a float having a body, an activation magnet mounted to the body and a downwardly depending vertical member which is positioned within the vertical hole, the vertical member having at least one member which resists removal of the float from the shaft, wherein vertical motion of the float moves the activation magnet with respect to the magnetically activated switch, causing the switch to change state.

6. The float sensor of claim 5 wherein the magnetically activated switch is a reed switch.

7. The float sensor of claim 5 wherein the horizontal shaft has an upper surface and a lower surface and extending from a lower surface a flange which prevents mounting the float body over the lower surface.

8. The float sensor of claim 5 wherein the vertical member and the opening are complementary in shape and not axisymmetric so that the vertical member can be positioned in the only one orientation within the opening.

9. The float sensor of claim 7 wherein the upper surface of the horizontal shaft is convex.

10. The float sensor of claim 5 wherein the float sensor body terminates in an insertion guide structure, for insertion through the grommet into the tank, the horizontal shaft and the body of the float when positioned against the horizontal shaft and the vertical member shooting within the profile of the guide structure.

11. A float sensor for insertion in a vertical wall of a tank of the type having:
    a connector having two leads and having a portion which remains outside of the tank;
    an elastomeric grommet positionable within the hole formed in the vertical wall;

a horizontal shaft extending from the connector and terminating in an insertion guide structure, for insertion through the grommet into the tank;

a reed switch positioned within the horizontal shaft and connected across the two leads;

a float body containing an activation magnet mounted to the horizontal shaft for vertical movement in response to the presence of the liquid in the tank;

wherein the improvement comprises:

a vertical member extending downwardly from the float body; and portions of the horizontal shaft forming an opening through which the vertical member extends the vertical member passing through the opening, a part of the vertical member preventing the float body from being removed from the opening.

12. The float sensor of claim 11 wherein the horizontal shaft has an upper surface and a lower surface and extending from a lower surface a flange which prevents mounting the float body over the lower surface.

13. The float sensor of claim 11 wherein the vertical member and the opening are complementary in shape and not axisymmetric so that the vertical member can be positioned in the only one orientation within the opening.

14. The float sensor of claim 12 wherein the upper surface of the horizontal shaft is convex.

* * * * *